United States Patent

[11] 3,547,269

[72] Inventor Ken-Ichiro Kurita
 Suita, Osaka, Japan
[21] Appl. No. 780,723
[22] Filed Dec. 3, 1968
[45] Patented Dec. 15, 1970
[73] Assignee Kurita Machinery Manufacturing
 Company, Limited
 Osaka, Japan

[54] APPARATUS FOR RELEASING AND COUPLING FILTER PLATES IN A FILTER PRESS
 1 Claim, 10 Drawing Figs.
[52] U.S. Cl. .................................................. 210/230
[51] Int. Cl. .................................................. B01d 25/12
[50] Field of Search .......................................... 210/225,
 230, 236; 100/198

[56] References Cited
UNITED STATES PATENTS
3,366,243 1/1968 Kurita .......................... 210/225

Primary Examiner—Reuben Friedman
Assistant Examiner—C. M. Ditlow
Attorney—Wenderoth, Lind & Ponack ABSTRACT: Each of the filter plates in a filter press is provided on opposite edges with hook members which are adapted to be engaged with stud members on the next filter plate. When a filter plate is moved for the removal of filter cake, the hook members of the next filter plate are released from the stud members of the third plate, and in this manner all the plates can be released or coupled successively one by one.

KEN-ICHIRO KURITA, Inventor

KEN-ICHIRO KURITA,
Inventor

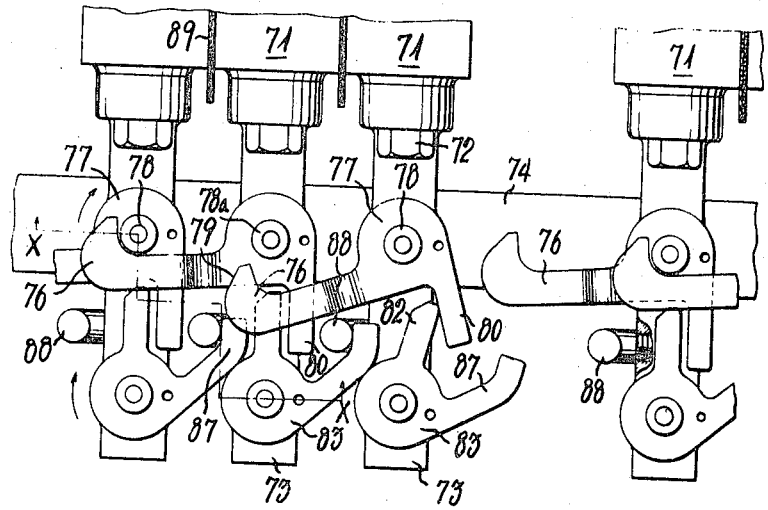
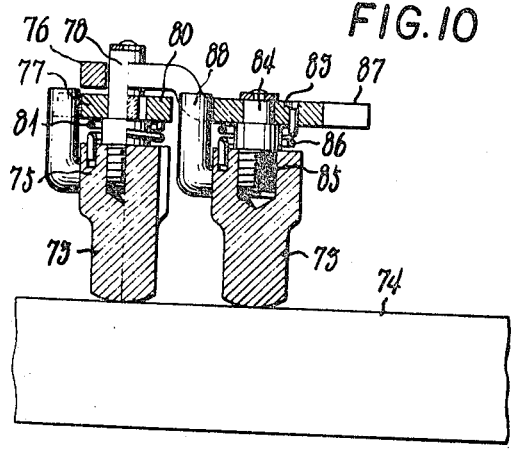

3,547,269

APPARATUS FOR RELEASING AND COUPLING FILTER PLATES IN A FILTER PRESS

The present invention relates to an apparatus for releasing and coupling filter plates for a filter press and more particularly to an apparatus for releasing the filter plates one by one and coupling the same.

In general, the adjacent filter plates in a filter press are stuck to each other quite tightly due to the sticking property of filter cake which is attributable to the quality of the liquid treated. Accordingly, when, for instance, the filter plates are to be moved one by one to remove the filter cake, two or more of the plates are stuck and moved together and there arises a difficulty in releasing them from each other.

An object of the present invention is to overcome the above-mentioned disadvantage. According to the invention, each of the filter plates is provided with hook members which are engaged with stud members on the next filter plate. When a filter plate is moved, the hook members of the next filter plate are released from the stud members of the third plate and in this manner the filter plates can be moved successively one by one without fail.

Another object of the present invention is to provide a structure in which the engagement of the hook member with the stud member is effected by the movement of the links of each plate or of actuating members equivalent thereto and to further provide means by which the releasing and coupling of filter plates can be effected reliably even in case the dimensions of the filter plates should involve errors created in manufacturing steps.

The objects and advantages of the present invention will become apparent from the following description and accompanying drawings, in which:

FIG. 9 is a plan view showing another modified embodiment; and

FIG. 10 is a front view in vertical section taken along the line X–X in FIG. 9.

Figure 1:
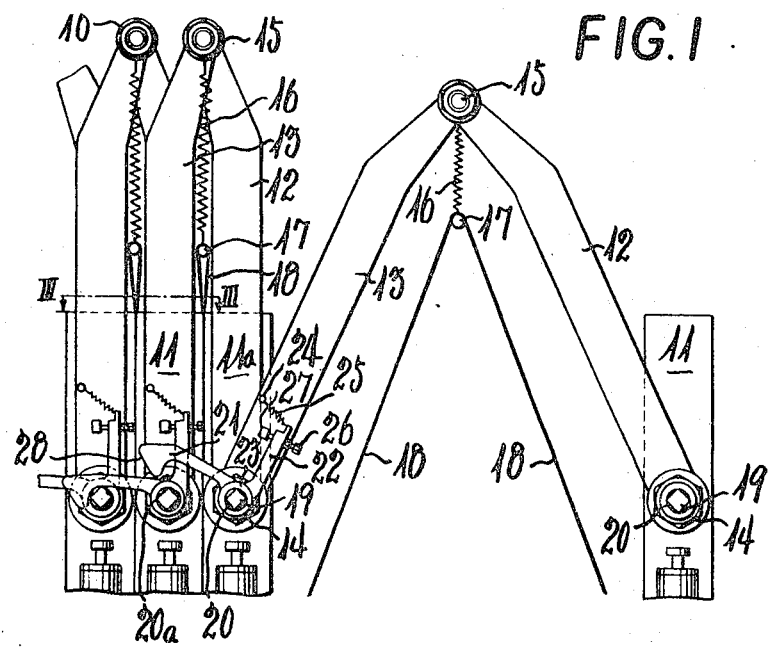
FIG. 1 is a front view showing an embodiment of the present invention, the lower portions of filter plates being omitted.
Figure 2:
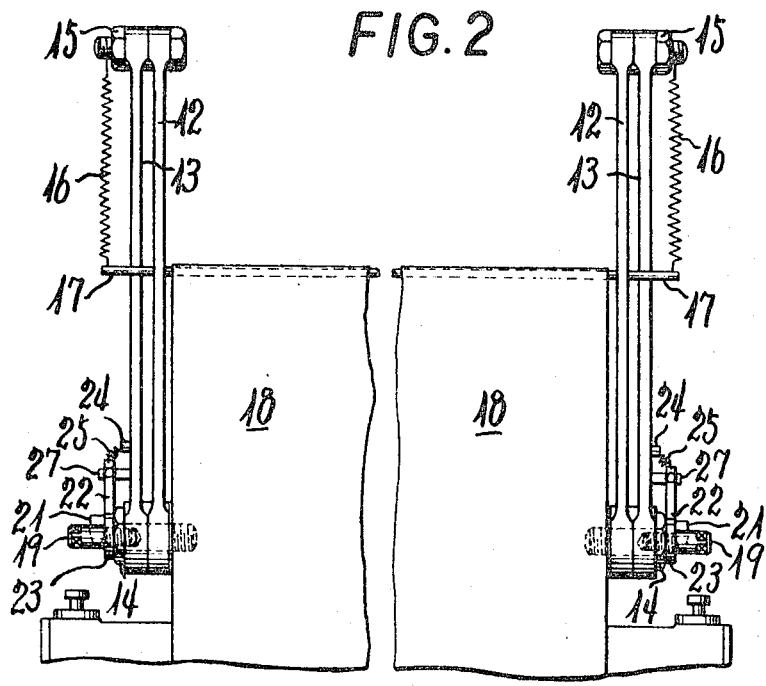
FIG. 2 is a side elevation.
Figure 3:
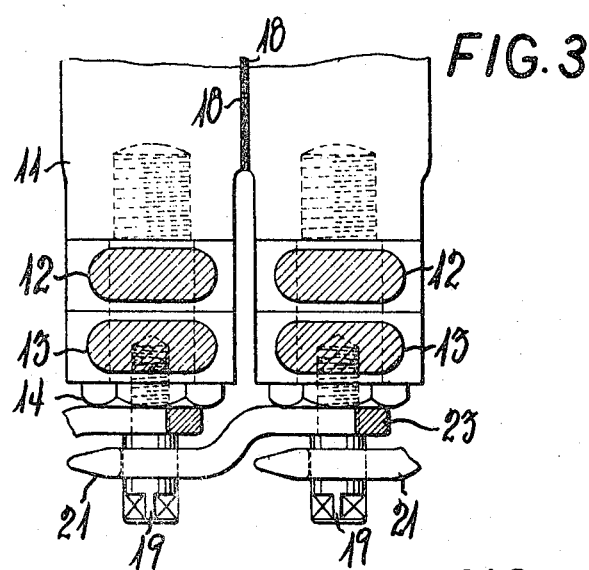
FIG. 3 is a plan view in cross section taken along the line III–III in FIG. 1.

Referring to FIGS. 1 to 3, numeral 11 designates filter plates with links 12 and 13 pivotally mounted on pivots 14 on the opposite side edges thereof. The upper end portions of the respective links 12 and 13 attached to each two adjacent filter plates are joined together by connecting members 15 such as bolts, pantographic units thereby being formed. On the shaft of each connecting member 15 is hung a rod 17 by means of a coil spring 16, and a filter cloth 18 attached to the filter plates 11 facing toward each other is hung on the suspended rod 17. On the stud member 20 of a bolt 19 screwed into the pivot 14 are pivotally mounted a hook 21 to be caught on the stud member 20a of the next filter plate and an adjusting member 22 disposed at a right angle with the hook by means of bosses 23 thereof. A spring 25 is provided between the tail end of the adjusting member 22 and a spring hook 24 on the link 13.

An adjusting bolt 26 screwed into the end portion of each adjusting member 22 is adapted to bear against a protrusion 27 which is formed on the link 13 as shown in the drawing.

It will be seen in the above embodiment illustrated in FIG. 1 that when the filter plate 11 is moved to the right the links 12 and 13 are brought into open position as shown, thereby permitting the filter cloth 18 to be detached from the surface of the filter plate to facilitate the removal of the filter cake. Since the protrusion 27 on the link 13 supports the adjusting member 22 by means of the bolt 26, the hook 21 integral therewith is moved pivotally on the stud member 20 as illustrated in the drawing as the link 13 is inclined. The hook 21 gets gradually released from the stud member 20a of the third filter plate and when the first filter plate 11 has completely finished the travel, the hook 21 of the second filter plate 11a gets completely detached from the stud member 20a of the third filter plate.

When a filter plate has finished traveling in this manner, the next filter plate alone is ready for the travel. Thus the filter plates are moved exactly one by one and through this travel the filter cloth can be detached from respective plates. In the head portion of the hook 21 is formed a slanting plane 28 which is adapted to slip upwards upon hitting the mating stud member 20 when the filter plate is returned to the original position, the head portion thereafter being automatically brought into engagement with the stud member. Since the degree of the engagement of the hook 21 with the stud member 20 can be adjusted by turning the adjusting bolt 26 on the adjusting member 22, the timing to release the next filter plate from the engagement with the third filter plate can be controlled as desired in accordance with the distance of the travel of the filter plate 11.

Figure 4:
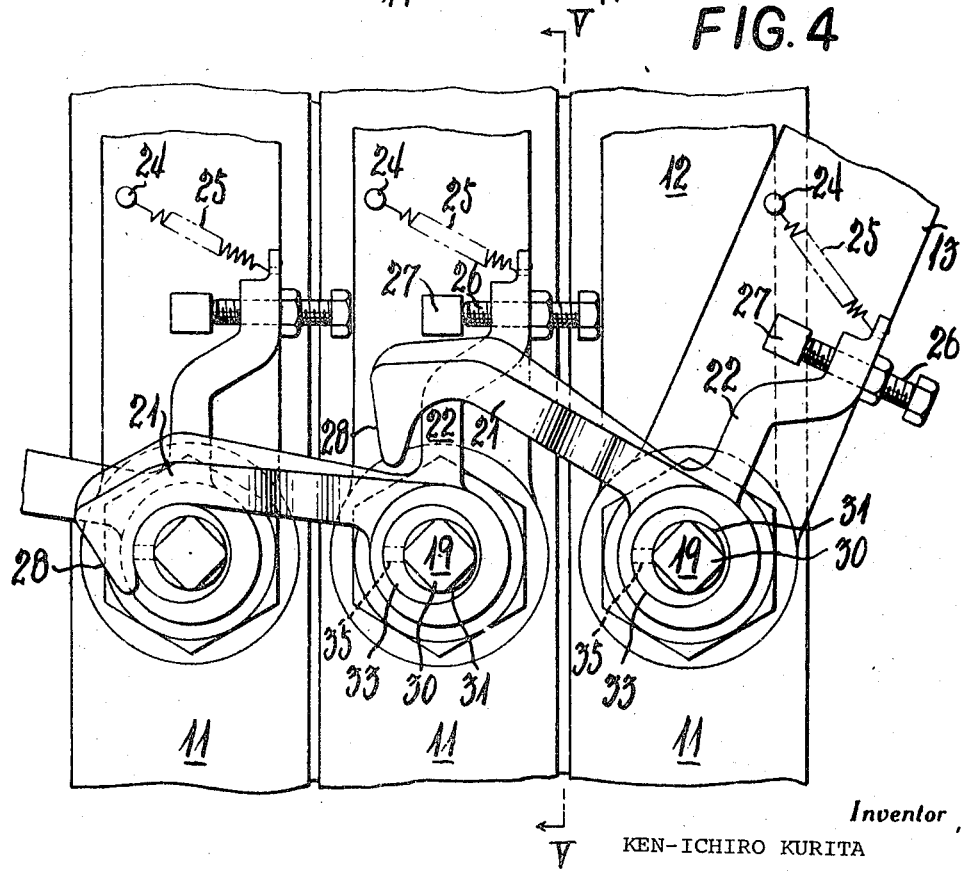
FIG. 4 is a front view showing a modified embodiment.
Figure 5:
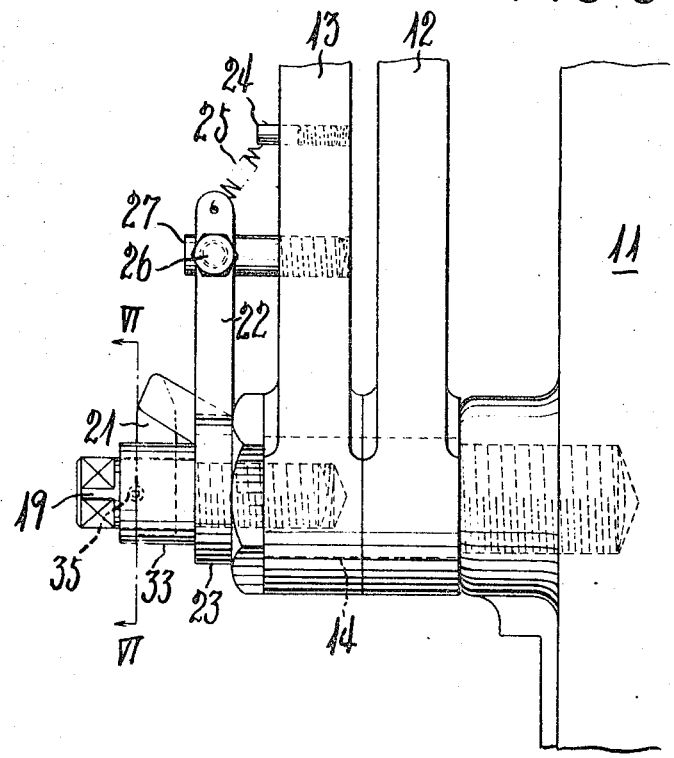
FIG. 5 is a side elevation taken along the line V–V in FIG. 4.
Figure 6:
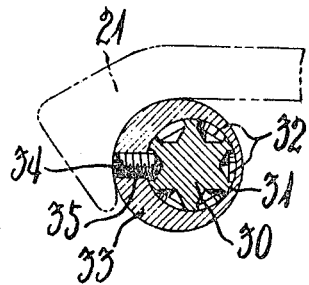
FIG. 6 is a view in section taken along the line VI–V in FIG. 5.

FIGS. 4 to 6 illustrate a modified embodiment of the present invention. The structure of the embodiment being identical with that of the embodiment in FIGS. 1 to 3 except for the modified portions, the reference thereto is made by the same reference numbers. Several recessed portions 32 arranged radially are formed in the outer peripheral surface of the stud member 31 of the bolt 30 which is screwed into the pivot 14 on the filter plate 11 for links 12 and 13 on the filter plate. The stud member 31 is fitted with an eccentric ring 33 into which is driven a screw 35 having a square hole 34 in the head portion thereof, with the forward end of the screw fitted in the above-mentioned recessed portion 32. With the eccentric ring 33 is engaged a hook 21 of the preceding filter plate.

In case there is an error in the thickness of the filter plate which was produced in the manufacturing steps or especially when an error is found in the distance between each two adjacent filter plates depending upon the kind of the filter cloth to be used therebetween, it is very likely that a clearance may be produced between the hook 21 and stud member to be engaged therewith or the hook 21 may fail to engage the stud member. In accordance with the embodiment shown in FIGS. 4 to 6 above, the degree of the eccentricity can be selectively determined in fitting the eccentric ring 33 to the stud member 31 and the ring may then be locked by the screw 35, so that the failure of engagement between the hook and the mating member is eliminated to thus ensure exact operation of the two members for effecting reliable and smooth coupling and releasing of the filter plates.

It will be apparent in each of the above-mentioned embodiments that the link 13 serves as an actuator for the hook member. On the other hand in FIGS. 7 and 8, there is shown another embodiment in which the hook member is actuated into movement not by the action of the link member attached to the filter plate but by the travel of the filter plate. On a rod portion 46 of a bolt 45 which is fastened to each of the opposite sides of the filter plate 41 is pivotally mounted an actuating member 44 having a protrusion 42 in the upper portion and a leg 43 in the lower portion. The ends of a coil spring 47 surrounding the bolt 45 are respectively connected to the filter plate 41 and actuating member 44. An extending portion 48 smaller in diameter than the rod portion 46 is fitted with a boss 51 of the hook 50 and further with a ringlike stud 52. The forward end of a screw 53 having a square hole and screwed into the stud 52 is inserted into one of the several recessed portions (not shown) formed around the extending portion 48. The hook 50 has a slanting plane 49 in the head portion and the boss thereof is provided with an adjusting member 55. Between the end of the adjusting member 55 and a pin 54 on the actuating member 44 is a spring 56. As in the foregoing embodiment, an adjusting screw 57 screwed into the adjusting member 55 is brought into contact with a protrusion 58 on the actuating member 44. A washer is indicated at 59. Attached to each of the filter plates 41 is a protruding member 62 having a pin 60 and reengaging member 61 to be brought into contact with the protrusion 42 on the actuating member 44.

When a filter plate is moved and released as indicated by the arrow, the actuating member 44 is moved pivotally by the spring 47 until the leg 43 abuts a stopper 63. In case the spring 47 is prevented from moving freely by spattered cake and accordingly the actuating member 44 fails to move, the pin 60 on the protruding member 62 pushes the protrusion 42 of the second filter plate 41a forward and inclines the same just as the actuating member is inclined by means of the spring 47. In this manner, the hook 50 attached to the filter plate 41a is disengaged from the stud 52 of the third filter plate 41b. The actuating member 44 of the filter plate 41 which has finished the travel is brought into a vertical position by the protrusion 42 thereof striking against the reengaging member 61 on the protruding member 62 attached to the preceding filter plate, the coil spring 47 thereby being wound, thus placing the hook member 50 into a position ready for engagement with the stud 52 of the following filter plate.

The embodiment described above can be readily applied to the coupling structure for the filter plates of other type which are not connected by means of pantographic links shown in FIG. 1. This embodiment is advantageous in that the respective parts are less likely to be soiled by splashes of filtrate and cake as compared with the previously described embodiments since they are positioned more away from the opposite sides of the filter plates.

Figure 8:
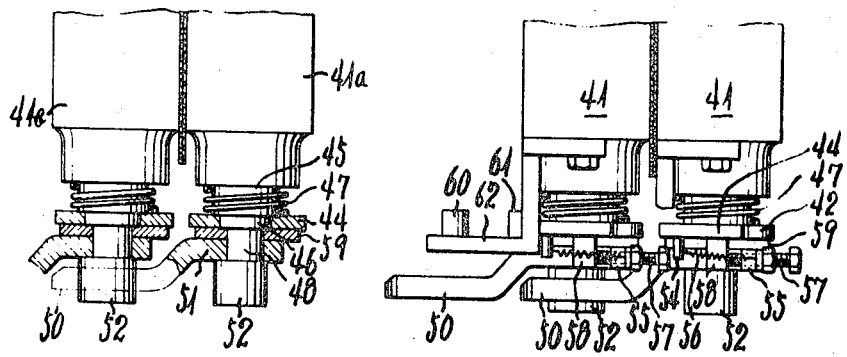
FIG. 8 is a plan view of FIG. 7 with a portion shown in a cross-sectional plan view taken along the line VII–VII.

FIGS. 9 and 10 illustrate another embodiment in which, as in the embodiment shown in FIG. 8, the coupling and releasing of filter plates are carried out automatically in response to the travel of the filter plates. Protruding members 73 attached by bolts 72 to the opposite side portions of each filter plate 71 extend sidewise of the plate 71 and are supported on side rails 74 at the under surfaces thereof. A boss 77 of a hook 76 pivoted on a stud portion 78 is supported on a boss support 75 which is provided on the upper surface of the member 73 and positioned proximate to the filter plate. In the head portion of the hook 76 is formed a slanting plane 79 so as to facilitate the engagement of the head portion with the next stud member 78a and the tail end is formed with a tail member 80. Between the hook 76 and the boss support 75 is disposed a coil spring 81 acting thereon.

An actuating member 83 having an actuating bar 82 to be engaged with the tail member 80 is pivoted at 84 on a support 85 on the protruding member 73 which is disposed away from the filter plate. A coil spring 86 is provided between the actuating member 83 and the support. A release member 87 projecting from the actuating member 83 is adapted to be engaged with a release pin 88 implanted in the protruding member 73 on the preceding filter plate. Numeral 89 designates a filter cloth.

When a preceding filter plate is moved, the release pin 88 thereon pushes the release member 87 of the actuating member 83 of the following filter plate and turns the actuating member 83. The actuating bar 82 in turn pushes the tail member 80 and turns the hook 76 to get the same released from the stud portion 78a. In this manner the filter plates are released in succession.

Figure 7:
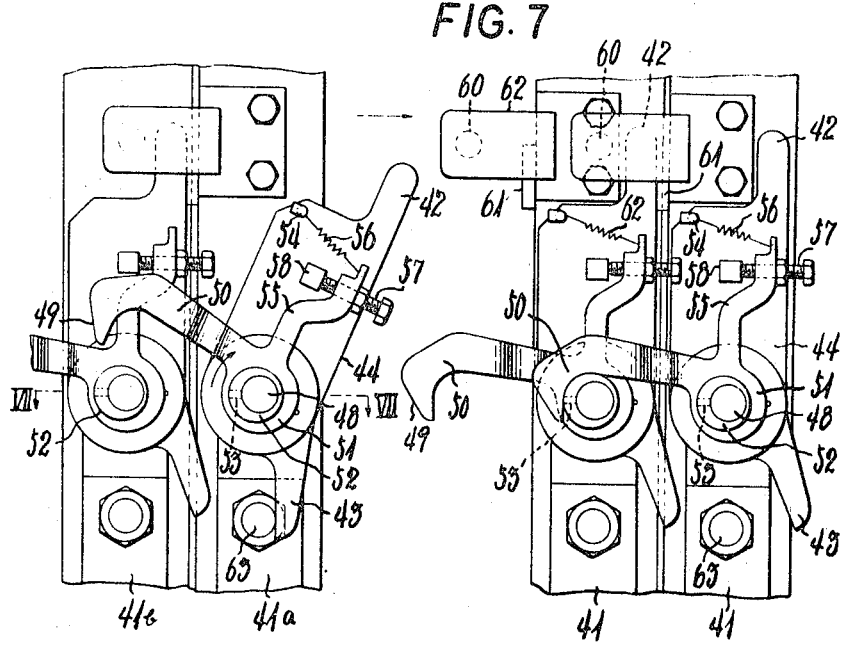
FIG. 7 is a front view showing another modified embodiment.

Just as the embodiment in FIGS. 7 and 8, this embodiment can be employed in any coupling structures of the filter plates with an advantage that the coil spring for effecting the automatic movement of the hook and actuating member can be protected from the filtrate and filter cake.

The apparatus of the present invention is not limited to the embodiments described above. Particularly, the actuating member for bringing the hook member into movement upon the travel of the filter plate can be embodied in various alterations.

I claim:

1. A filter press provided with a rod hung on a spring attached to a connecting member which joins the upper ends of a pair of links, two pairs of the links being respectively attached to opposite edges of each two adjacent filter plates, a filter cloth being hung on said rod, an apparatus for releasing and coupling filter plates comprising a hook member provided on each side edge of each filter plate and adapted to be released from a hook-engaging member in a next filter plate against a restoring spring upon the pair of links being brought into an open position; a rotatable ring being so constructed and arranged on said stud member as to provide an adjustable connection between said ring and said hook member and said restoring spring being attached between the tail of said hook member and the associated filter plate thereby providing a restoring force on said hook member in opposition to the direction of engagement with said stud member.